(12) United States Patent
Ohsuge

(10) Patent No.: US 6,351,635 B1
(45) Date of Patent: Feb. 26, 2002

(54) MOBILE TELEPHONE WITH VOICE DATA COMPRESSION AND RECORDING FEATURES

(75) Inventor: Michihiro Ohsuge, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/193,465

(22) Filed: Nov. 17, 1998

(30) Foreign Application Priority Data

Nov. 18, 1997 (JP) .............................................. 9-316670

(51) Int. Cl.$^7$ ............................................. H04M 11/10
(52) U.S. Cl. ........................ 455/413; 455/412; 455/414
(58) Field of Search ................................ 455/412, 413, 455/414, 72, 550, 563, 575; 379/88.1; 341/60

(56) References Cited

U.S. PATENT DOCUMENTS

| | | | | |
|---|---|---|---|---|
| 4,841,299 A | * | 6/1989 | Weaver | 341/65 |
| 5,325,238 A | * | 6/1994 | Stebbings et al. | 360/15 |
| 5,438,700 A | * | 8/1995 | Hashimoto et al. | 455/563 |
| 5,651,056 A | * | 7/1997 | Eting et al. | 455/563 |
| 6,081,593 A | * | 6/2000 | Kim | 455/413 |

FOREIGN PATENT DOCUMENTS

EP          0660299 B1  *  11/1994

* cited by examiner

Primary Examiner—Vivian Chang
Assistant Examiner—Eliseo Ramos-Feliciano
(74) Attorney, Agent, or Firm—Scully, Scott, Murphy & Presser

(57) ABSTRACT

At providing a voice recording function for a mobile telephone, an additional circuit is small and the simplification of the circuit is possible, in case of that more voice data are preferred to be stored, the voice data of PHS are able to be further compressed and stored and the recording time is able to be increased and user himself can select the priority of the voice quality or the recording time, the above mentioned mobile telephone is provided. At the mobile telephone having plural voice encoding system, the mobile telephone provides an encoding/decoding feature, a voice data storing feature, a decoding and playback feature, a decoded data storing means and a data compression feature. The encoding/decoding feature provides a voice codec section, a controller and a recording key, and encodes and decodes the voice corresponding to a First voice encoding system. The voice data storing feature provides a voice data memory and stores encoded voice data. The decoding and playback feature provides the controller, the voice data memory, the recording key and three decoders, and the stored voice data are decoded and play backed at arbitrarily time. The decoding feature provides three decoders, the controller and the recording key, and decodes the stored data of the first voice encoding system at arbitrary time. The decoded data storing feature provides a data buffer storing the decoded data temporarily. The data compression feature provides a compression key, the controller and three encoders, and stores re-encoded data by a second voice encoding system in the voice data memory and compresses the data.

6 Claims, 3 Drawing Sheets

MOBILE TELEPHONE WITH VOICE DATA COMPRESSION AND RECORDING FEATURES

BACKGROUND OF THE INVENTION

The present invention relates to a mobile telephone, especially a voice recording device thereof.

DESCRIPTION OF THE RELATED ART

As a voice recording device of a conventional mobile telephone, for example, the Japanese Patent Laid-Open Publication No. HEI 2-78058 discloses the voice recording device which provides an analog/digital converter for converting an analog voice signal to a digital voice signal at a fixed sampling frequency, a memory means for memorizing voice data converted analog to digital by the sampling frequency and a digital/analog converter for converting signals read out from this memory means digital to analog. Moreover, the voice recording device provides a time measuring means for measuring recording time and a compression rate controller for controlling to increase the compression rate of the voice signals responding to the increase of the recording time measuring by this time measuring means. In this example, this voice recording device has constitution having variable recording time by changing the sampling rate.

At the mobile telephone which is usable for plural digital mobile telephone systems, it is necessary that the mobile telephone has plural voice encoder/decoder i.e. voice codecs having voice compression systems stipulated by the systems respectively. For example, at the case of the mobile telephone which is usable for both PDC and PHS systems, at this, PDC system is the Japanese digital mobile telephone system, it is necessary that the mobile telephone provides both voice codecs named V-SELP and PSI-CELP systems adopted by PDC system and a voice codec named ADPCM system adopted by PHS, or switches to either system by computer software.

Moreover, at the conventional digital mobile telephone system, and at a telephone answering state or a busy state, the voice recording device is utilized widely to record a message from callers. To meet this, for example at PDC, by applying voice compression of V-SELP and PSI-CELP being standard voice codecs, a storing means for storing voice data encoded by these voice codecs in a memory is used, at this, encoded data means compressed data. In this case, a voice encoding (compressing) device only for the voice recording is not needed, the construction of the device is simplized.

However, in the case that the voice recording is implemented by utilizing the voice codec stipulated by the mobile telephone system at the conventional technology, there are following problems.

The encoding rate (data compression rate) of the voice codec of PDC is different from that of PHS, therefore at the mobile telephone usable for plural digital mobile telephone systems, such as a mobile telephone usable for both PDC/PHS, even at the memory has the same storage capacity, the recording time and numbers are different between PDC and PHS. For example, even providing the memory capable of recording 40 seconds at V-SELP of PDC, ADPCM of PHS can record for only about 8 seconds being about ⅕ of PDC. Therefore, even the storage capacity is excess for PDC, the memory enough to record at PHS should be provided, then there is a disadvantage for cost.

At the conventional technology, both the voice codec needed for the system itself and the codec for voice recording are required to be provided, therefore by using additionally a voice compression device only for recording that is not the voice codec using at the radio system, at the above mentioned case usable for both PDC/PHS, the recording time is not different between the different systems. However, in this case the circuit size becomes large.

Generally, the relation between the compression rate and the voice quality is a tradeoff at the conventional technology, however it is convenient for user to be able to choose the voice quality or the recording time as priority, therefore at the mobile telephone usable for plural systems, such as usable for both PDC and PHS, the voice quality is different among systems. For example, in the case using the same voice encoder for both PDC and PHS, especially at adjusting to the voice encoder of the bad voice quality system, the advantage of PHS i.e. the good voice quality is not possible to be kept.

SUMMARY OF THE INVENTION

It is therefore an object of the present invention to provide a mobile telephone whose circuit is able to be simplified with small added circuit, at putting a voice recording function to the mobile telephone, and provides a mobile telephone in which data encoded by ADPCM of PHS is able to be converted to the data encoded by PSI-CELP or V-SELP of PDC and in case of that a user wants to store more voice data, the voice data of PHS is further compressed and is able to be stored, and provides a mobile telephone in which the voice recording time is able to be increased and a user is able to choose the voice quality or the recording time as priority.

According to a first aspect of the present invention, to solve the above mentioned problems, in a mobile telephone which has switchable plural voice encoding systems stipulated corresponding to communication systems, the present invention provides a mobile telephone, having an encoding/decoding means for encoding and decoding voice of caller or user corresponding to a first voice encoding system in said plural voice encoding systems stipulated by said communication systems, a voice data storing means for storing the encoded voice data, a voice data decoding and playback means for decoding and playback said stored voice data in said voice data storing means at the arbitrary time, a voice data decoding means for producing decoded data decoding said voice data stored by said first voice encoding system at the arbitrary time, a decoded data storing means for storing said decoded voice data temporarily and a data compression means for compressing the data by storing in said voice data storing means the re-encoded data by a second voice encoding system in said plural voice encoding systems.

According to a second aspect of the present invention, the mobile telephone provides a data compression selection means in which the user himself can select whether the voice data stored in said voice data storing means are compressed or not arbitrarily.

According to a third aspect of the present invention, the mobile telephone provides a re-encoding means in which during call the voice of caller is decoded and played back from a speaker, at the same time, the voice is re-encoded in another voice encoding mode stipulated by the system, wherein said voice data storing means is operated as a memory means memorizing the reencoded voice data.

According to a fourth aspect of the present invention, in the mobile telephone, said data compression means utilizes the voice encoding/decoding means stipulated by said communication systems for voice recording and converts the voice data stored by the plural voice encoding systems to the highest data compression rate encoding system and makes the long recording time possible.

According to a fifth aspect of the present invention, in the mobile telephone, said decoding and playback means and said data compression means include a voice codec section providing decoders and encoders corresponding to said plural voice encoding systems and said voice codec section is constituted of hardware or software.

According to a sixth aspect of the present invention, in the mobile telephone, said data compression means decodes the voice data by ADPCM system and encodes by PSI-CELP system and stores in said voice data storing means.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
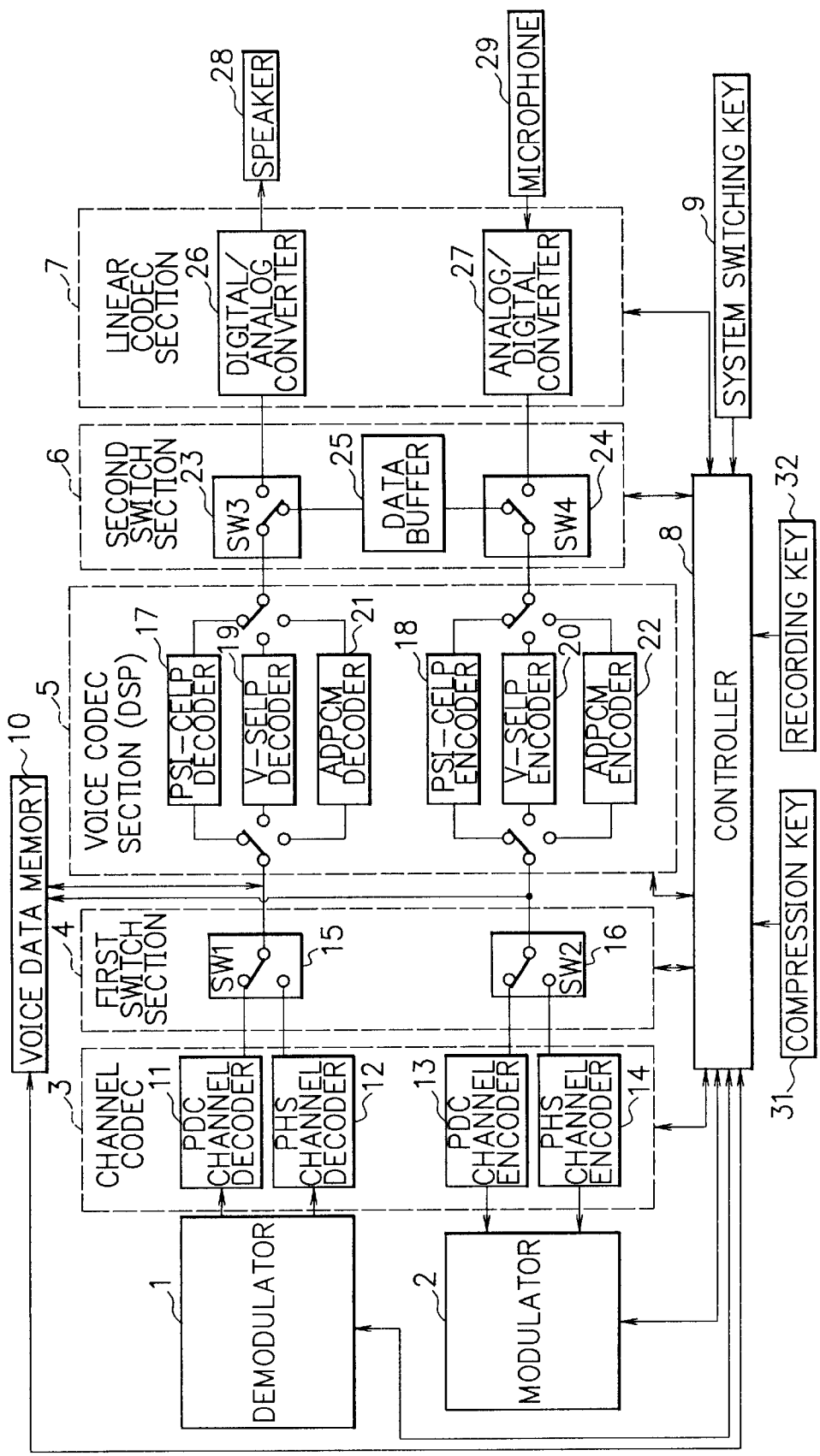
FIG. 1 is a block diagram showing the construction of a voice recording device of a mobile telephone of a first embodiment of the present invention.

Referring now to the drawings, embodiments of the present invention are explained in detail. At a first embodiment of the present invention, to simplify the explanation, a mobile telephone usable for both PDC AND PHS is explained as an example, however the present invention is applicable for a mobile telephone usable for plural other digital mobile telephone systems.

FIG. 1 is a block diagram showing the construction of a voice recording device of the mobile telephone of a first embodiment of the present invention. Referring to FIG. 1, the voice recording device of the mobile telephone of the first embodiment of the present invention provides a a demodulator 1 and a modulator 2 usable for both PDC and PHS, a channel codec 3 implementing bit operation stipulated by the system, such as scramble cancellation, error checking by cyclic code, etc. and a first switch section 4 switching the channel codec 3 of PDC and PHS. The channel codec 3 provides a PDC channel decoder 11 and a PHS channel decoder 12 connecting to the demodulator 1 and a PDC channel encoder 13 and a PHS channel encoder 14 connecting to the modulator 2. The first switch section 4 provides a first switch (SW1) 15 and a second switch (SW2) 16.

The voice recording device has a voice codec section (DSP) 5 constituted of computer software by a digital signal processor DSP. This voice codec section (DSP) 5 provides a PSI-CELP decoder 17 and a PSI-CELP encoder 18 being a PSI-CELP codec, a V-SELP decoder 19 and a V-SELP encoder 20 being a V-SELP codec, and a ADPCM decoder 21 and a ADPCM encoder 22 being a ADPCM codec and has the constitution swichable arbitrary to one of the three kinds of codecs responding to a using condition. For a normal call of PDC, the PSI-CELP decoder 17, the PSI-CELP encoder 18, the V-SELP decoder 19 and V-SELP encoder 20 are used, for a normal call of PHS, the ADPCM decoder 21 and the ADPCM encoder 22 are used.

The voice recording device provides a second switch section 6 connecting to the voice codec section (DSP) 5. The second switch section 6 provides a third switch (SW3) 23 connecting to a switchable switch to the PSI-CELP decoder 17, the V-SELP decoder 19 and the ADPCM decoder 21, a forth switch (SW4) 24 connecting to a switchable switch to the PSI-CELP encoder 18, the V-SELP encoder 20 and the ADPCM encoder 22, and a data buffer 25. The data buffer 25 is a decoded data storing means for storing temporarily digital data from the ADPCM decoder 21.

The voice recording device provides a linear codec section 7 connecting to the second switch section 6. The linear codec section 7 provides a digital/analog converter 26 converting digital signals connected to the third switch (SW3) 23 to analog signals and an analog/digital converter 27 converting analog signals connected to the fourth switch (SW4) 24 to digital signals. The digital/analog converter 26 connects to a speaker 28 outputting analog voice signals and the analog/digital converter 27 connects to a microphone 29 converting voices to electric signals.

The voice recording device provides a controller 8 connecting to each section and controlling each operation. The controller 8 connects to a system switching key 9 and further connects to a compression key 31 and a recording key 32. The selection of PDC or PHS is implemented by the system switching key 9, the controller 8 instructs each switching. The compression key 31 is provided to switch on at the case saving the capacity of the memory by compressing the ADPCM data recorded voice data at PHS. Further, the recording key 32 instructs to record voices via the controller 8.

The encoding/decoding means is provided to encode and decode the voice of caller or user and is constituted of the voice codec section (DSP) 5, the recording key 32 and the controller 8 controlling the switching the first switch section 4 and the second switch section 6 instructed by the recording key 32.

The decoding and playback means is constituted of the recording key 32, the voice data memory 10, the PSI-CELP decoder 17, the V-SELP decoder 19, the ADPCM decoder 21 and the controller 8 controlling these operation.

The decoding means is possible to produce the decoded data decoding the stored data in the voice data memory 10 at arbitrary time and is constituted of the recording key 32, the voice data memory 10, the PSI-CELP decoder 17, the V-SELP decoder 19, the ADPCM decoder 21 and the controller 8 controlling these operation.

Further, the voice recording device provides the voice data memory 10 constituting of RAM and so forth storing the voice data. The voice data memory 10 is a means for storing the voice data encoded by the voice codec section (DSP) 5.

The voice recording device, as a means for using the capacity of the memory effectively by compressed the voice data, provides a data compression means for converting the voice data encoded by PSI-CELP. The data compression means is constituted of the PSI-CELP encoder 18, the V-SELP encoder 20 and the ADPCM encoder 22. As a concrete example of the data compression means, the data compression is implemented by that a user instructs the compression key 31 the compression of the voice data, the ADPCM data in the voice data memory 10 are decoded via the ADPCM decoder 21, the decoded ADPCM data are encoded by the PSI-CELP system via the PSI-CELP encoder 18 and again are stored in the voice data memory 10. These PSI-CELP encoder 18 and ADPCM decoder 21 are also usable for a normal call. The third switch (SW3) 23 and the fourth switch (SW4) 24 of the second switch section 6 control these data paths under the instruction of the controller 8.

At the first embodiment of the present invention, by switching on the compression key 31, the voice data stored in the ADPCM system is able to be converted to the PSI-CELP system, therefore the data is possible to be compressed.

As mentioned above, in the plural voice codecs stipulated by systems, at the digital system mobile telephone usable for plural systems, the voice recording device of the first embodiment of the present invention provides a data compression means for converting the voice data encoded by the voice codec which compression rate is low and stored, to the data coded by the voice codec which compression rate is high.

Therefore, the voice data are able to be compressed and the capacity of the voice data memory 10 is utilized effectively. It is possible to increase the recording time and at the time that the necessity of the data compression is not needed, the recording is possible to be implemented in high quality. Furthermore, the voice codec function needed originally is utilized and the circuit composition is able to be simplified.

Figure 2:
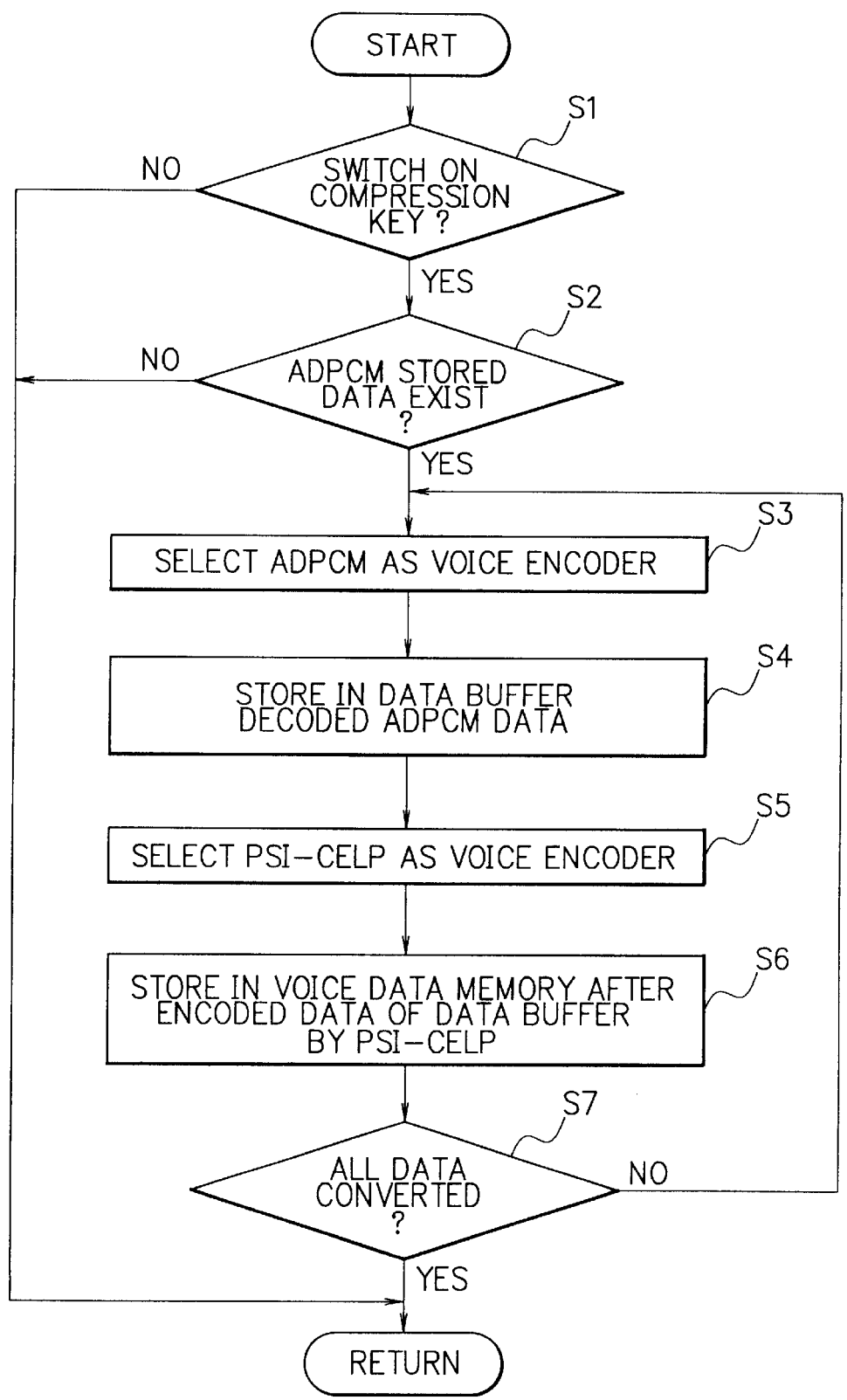
FIG. 2 is a flow chart showing the operation of the voice recording device of the mobile telephone of the first embodiment of the present invention.

Referring to FIGS. 1 and 2, the operation of the voice recording device of the first embodiment of the present invention is explained in detail.

The receiving data from the demodulator 1 implements the bit operation stipulated by the system such as scramble cancellation, error checking by cyclic code, etc. by the PDC channel decoder 11 and the PHS channel decoder 12. The first switch (SW1) 15 is a swichable switch to the PDC channel decoder 11 or the PHS channel decoder 12. The control of the operation of the first switch (SW1) 15 for this switching is implemented by the controller 8 as designated by the system selection key 9. The communication data passed through the first switch (SW1) 15 are converted to the digital voice data of 8 KHz sampling frequency by the PSI-CELP decoder 17 at the case of PDC half rate or the V-SELP decoder 19 at the case of PDC full rate or the ADPCM decoder 21 at the case of PHS constituted of digital signal processor DSP and converted to the analog signals by the digital/analog converter 26 via the third switch (SW3) 23. This analog signals are outputted from the speaker 28 as the voice.

The signals from the mobile telephone to the base station during calls are converted to the digital data by the analog/digital converter 27 passed from the microphone 29, and the data are compressed by the PSI-CELP encoder 18 at the case of PDC half rate or the V-SELP encoder 20 at the case of PDC full rate or the ADPCM encoder 22 at the case of PHS via the fourth switch (SW4) 24, via the second switch (SW2) 16, the data are pass the PDC channel encoder 13 or the PHS channel encoder 14 and reach the modulator 2. The second switch (SW2) 16 is a switch switching to the PDC channel encoder 13 or the PHS channel encoder 14. The normal call is explained in the above mentioned description.

Next, the operation of the voice recording using the voice recording device of the first embodiment of the present invention is explained. To record voices, by switching on the recording key 32 during calls, the output data from the PDC channel decoder 11 or the PHS channel decoder 12 according to the system during calls are stored to the voice data memory 10 from the controller 8. With this operation, the voice of caller is recorded for a certain time by the voice encoding system stipulated by the communication system.

At the case of the playback of the recorded voice data, during the waiting of reception, by switching on the recording key 32, the data stored in the voice data memory 10 pass through the PSI-CELP decoder 17 or the V-SELP decoder 19 or the ADPCM decoder 21 depending on the recorded voice encoding system and are converted at the digital/analog converter 25 and then the playback is implemented via the speaker 28.

At the case of that the data stored in the voice data memory 10 are the ADPCM data recorded at PHS and the capacity of the memory is needed to be saved by the compression of these data, by switching on the compression key 31, the controller 8 operates the switches such as the third switch (SW3) 23 or the fourth switch (SW4) 24 and switches the passes and takes out a bunch of voice data, for example one frame of data, from the voice data memory 10 and the data passed through the ADPCM decoder 21 are stored temporarily in the data buffer 25. At this time, the voice codec section (DSP) 5 is switched to the mode of the PSI-CELP codec mode and after this the data are compressed at the PSI-CELP encoder 18 and again are stored in the voice data memory 10. After this operation, by switching again the voice codec section (DSP) 5 to the ADPCM mode, the second frame is converted to the data encoded by the PSI-CELP system and this operation is repeated. With these operation, the ADPCM voice data are converted to the encoded data by PSI-CELP and the compression rate of PSI-CELP is highest, therefore the required memory capacity is possible to be decreased to about one tenth.

FIG. 2 is a flow chart showing the operation of the controller 8 at the time of compression. Referring to FIG. 2, the operation is explained. At the step S1, in case of the compression key 31 is switched on, the addresses of the voice data memory 10 are read at the step S2, whether the voice data stored in the ADPCM system exist or not is examined. At the case of that the data do not exist, the compression is not implemented. At the case of that the ADPCM data exist, the switches and DSP are controlled and ADPCM is operated as the voice encoding system at the step S3. At this state, until the voice data are filled in the data buffer 25, the decoding is implemented at the step S4, PSI-CELP is selected as the voice encoder at the step S5, the data of the data buffer 25 are encoded in PSI-CELP at the step S6, the data are stored in the voice data memory 10. Next, at the step S7 until the conversion of the stored ADPCM voice data is all completed, the operation of the steps from S3 to S6 are repeated.

Figure 3:
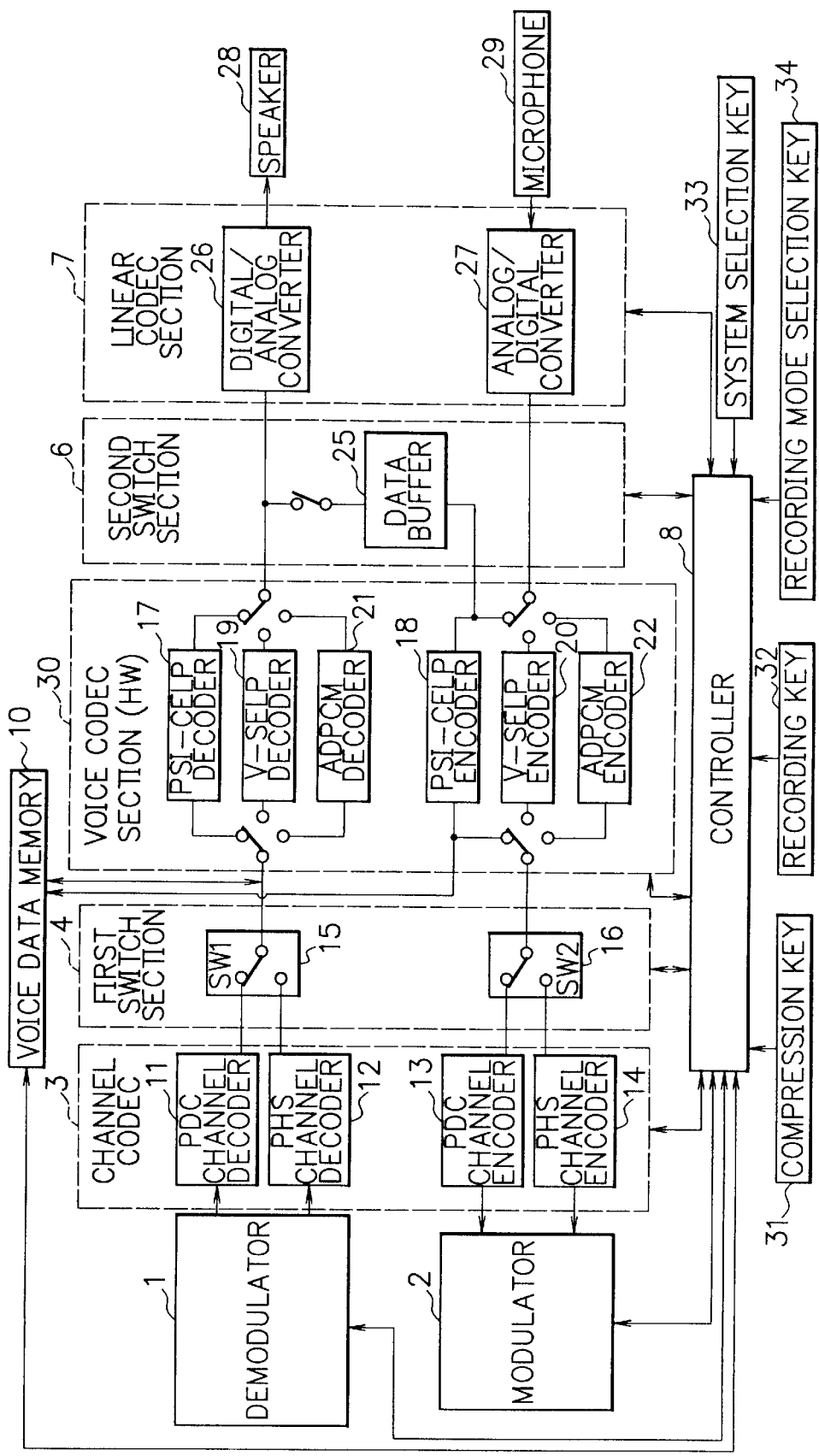
FIG. 3 is a block diagram showing the construction of the voice recording device of the mobile telephone of a second embodiment of the present invention.

Referring to FIG. 3, a second embodiment of the present invention is explained. FIG. 3 is a block diagram showing the construction of the voice recording device of the mobile telephone of the second embodiment of the present invention. At the first embodiment, by the digital signal processor utilized the software, in case of the construction of three kinds of voice codecs, basically each codec is switched, however at the second embodiment, all voice codecs are constituted of the hardware, the two or more voice codecs are possible to be operated at the same time, therefore the application mentioning below is possible.

In FIG. 3, instead of using the voice codec section (DSP) 5 constituted of DSP of FIG. 1 of the first embodiment, the second embodiment provides a voice codec section (HW) 30 constituted of the hardware which has V-SELP decoder and encoder, PSI-CELP decoder and encoder and ADPCM decoder and encoder. Further, the second embodiment provides a recording mode selection key 34 and a system selection key 33 to select the communication system PHS or PDC and a re-encoding means capable of recording voices compressed the data even during calls. The re-encoding means is constituted of the data buffer 25, the PSI-CELP encoder 18, the V-SELP encoder 20 and the ADPCM encoder 22.

Next, the operation of the voice recording device of the mobile telephone of FIG. 3 is explained. At the case of the second embodiment, even at the using time of PHS, the voice data compressed by the PSI-CELP system is possible to be stored in the voice data memory 10 directly. During calls in PHS, by switching on the recording key 32, the communication data passed through the PHS channel decoder 12 passes the ADPCM decoder 21 and becomes PCM voice data of 8 KHz. These data are temporarily stored in the data buffer 25 being a decoded data storing means, further pass through the PSI-CELP encoder 18 being a re-encoding means and are stored in the voice data memory 10 being a voice data storing means.

The above mentioned operation is the operation in case of the recording mode selected which the voice is compressed in CELP by the recording mode selection key 34, however the recording mode of ADPCM itself is also possible to be set.

The once recorded data by ADPCM are possible to be compressed by using the compression key 31, as the same as the first embodiment. Further, even at the case of the mobile telephone non-usable for plural systems and using plural voice codecs, for example, for the half rate and full rate PDC, the same application is possible.

The above mentioned second embodiment is applicable even in case of using DSP like as the first embodiment, when the ADPCM encoder and the PSI-CELP encoder are able to be operated at the same time.

As mentioned above, the present invention can utilize the original codec using the system itself and at the time of adding a voice recording function to the mobile telephone, the additional circuit is enough to be small and then the present invention can provides the mobile telephone which circuit is able to be simplified compared with using the codec only for the voice recording.

Moreover, according to the present invention, PSI-CELP or V-SELP used in PDC is able to be utilized, therefore the encoded data by ADPCM of PHS are able to be converted to the data encoded by PSI-CELP or V-SELP. With this, in case of that users want to store more voice data, the mobile telephone which is capable of storing more data by further compressed the voice data of PHS is possible to be provided.

According to the present invention, the voice recording at PHS is able to be stored in high voice quality as the same as at the normal PHS calls and when the saving of the capacity of the memory is the first priority, the recording time is able to be increased by compressing to about one tenth switched on the compression key. With this, the mobile telephone which users can select the voice quality or the recording time as priority is possible to be provided.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. In a mobile telephone which provides switchable plural voice encoding systems stipulated corresponding to communication systems, a mobile telephone, comprising:

an encoding/decoding means for encoding and decoding voice of caller or user corresponding to a first voice encoding system in said plural voice encoding systems;

a voice data storing means for storing the encoded voice data;

a voice data decoding and playback means for decoding and playback said stored voice data in said voice data storing means at an arbitrary time;

said voice data decoding means also producing decoded data decoding said voice data stored by said first voice encoding system at the arbitrary time;

a decoded data storing means for storing said decoded voice data temporarily;

a data compression means for compressing data by storing in said voice data storing means a re-encoded data by a second voice encoding system in said plural voice encoding systems a data compression selection means in which the user can select whether the voice data stored in the voice data storing means is compressed or not; and a re-encoding means in which the voice of the caller is decoded and played back, while at the same time, the voice is being recorded in another voice encoding mode stipulated by the system, wherein said voice data storing means is operated as a memory means memorizing the re-encoded voice data.

2. In a mobile telephone which provides switchable plural voice encoding systems stipulated corresponding to communication systems, a mobile telephone, comprising:

an encoding/decoding means for encoding and decoding voice of caller or user corresponding to a first voice encoding system in said plural voice encoding systems;

a voice data storing means for storing the encoded voice data;

a voice data decoding and playback means for decoding and playback said stored voice data in said voice data storing means at an arbitrary time;

said voice data decoding means also producing decoded data decoding said voice data stored by said first voice encoding system at the arbitrary time;

a decoded data storing means for storing said decoded voice data temporarily;

a data compression means for compressing data by storing in said voice data storing means a re-encoded data by a second voice encoding system in said plural voice encoding systems; and a re-encoding means in which during call the voice of a caller is decoded and played back from a speaker, at the same time, the voice is re-encoded in another voice encoding mode stipulated u the system, wherein said voice data storing means is operated as a memory means memorizing the re-encoded voice data.

3. A Mobile telephone in accordance with claim 2, comprising:

a data compression section means in which the user himself can select whether the voice data stored in said voice data storing means are compressed or not arbitrarily.

4. A mobile telephone in accordance with claim 2, wherein:

said data compression means utilizes the voice encoding/decoding means stipulated by said communication systems for voice recording and converts the voice data stored by the plural voice encoding systems to the highest data compression rate encoding system and makes the long recording time possible.

5. A mobile telephone in accordance with claim 2, wherein:

said decoding and playback means and said data compression means include a voice codec section providing decoders and encoders corresponding to said plural voice encoding systems and said voice codec section is constituted of hardware or software.

6. A mobile telephone in accordance with claim 2, wherein:

said data compression means decodes the voice data by ADPCM system and encodes by PSI-CELP system and sores said voice data storing means.

* * * * *